United States Patent [19]

Inaba et al.

[11] 4,181,914
[45] Jan. 1, 1980

[54] SYSTEM FOR REDUCING TRANSMISSION PROBLEMS IN A PARALLEL DIGITAL DATA TRANSMISSION SYSTEM

[75] Inventors: Masao Inaba; Atsumi Sugimoto; Mikio Shimizu; Toshitake Kouyama, all of Tokyo, Japan

[73] Assignee: Nippon Electric Co., Ltd., Tokyo, Japan

[21] Appl. No.: 862,028

[22] Filed: Dec. 19, 1977

[30] Foreign Application Priority Data

Dec. 20, 1976 [JP] Japan .................. 51-153683

[51] Int. Cl.² ........................... H04N 9/02
[52] U.S. Cl. ................... 358/1; 340/147 LP; 325/2
[58] Field of Search ............... 358/1; 340/146.1 BE, 340/147 LP, 147 SC; 255/303.4; 325/39, 40, 2

[56] References Cited

U.S. PATENT DOCUMENTS

| 3,487,309 | 12/1969 | Sarati | 325/2 |
|---|---|---|---|
| 3,681,694 | 8/1972 | Sarati | 325/2 |
| 4,011,542 | 3/1977 | Baichtal et al. | 340/147 LP |

Primary Examiner—Richard Murray
Attorney, Agent, or Firm—Hopgood, Calimafde, Kalil, Blaustein & Lieberman

[57] ABSTRACT

A digital transmission system wherein a signal to be transmitted is represented by a plurality of parallel data bits, each of said data bits having a positional significance ranging from a most significant data bit to a least significant data bit. Each of said data bits are assigned to one of a plurality of data transmission highways based on the positional significance of the data bit. Failure of a particular highway results in a reassignment of the data bits to the highways so that transmission degradation is minimized.

6 Claims, 4 Drawing Figures

SYSTEM FOR REDUCING TRANSMISSION PROBLEMS IN A PARALLEL DIGITAL DATA TRANSMISSION SYSTEM

1. Field of the Invention

This invention relates to a digital transmission system in which an information signal is converted into parallel data, including a combination of a plurality of bits representing the signal, and is transmitted in the form of such parallel data and, more particularly, this invention relates to a digital transmission system concerned with reducing transmissions problems in such a system transmission-trouble reducing systems effective to resulting from the failure of system transmission routes.

2. Description of the Prior Art

Generally, in a digital transmission system of the kind described above, an information signal is converted into parallel data, including as a representative thereof a combination of a plurality of bits differing in significance (LSB-MSB) from each other, and the plurality of bits are transmitted respectively through a plurality of transmission routes. The extent of transmission problems resulting from a failure in any one of the transmission routes depends upon the position (significance) of the bit in the parallel data to be transmitted through the faulty transmittion route. For example, if a failure occurs in the transmission route through which the least significant bit (LSB) is being transmitted, the resultant noise level is equal to $A/2^n$, wherein A is the maximum amplitude of the information signal and n is the number of bits representing the information signal. In this example, since the noise level is relatively low, the transmission problems are extremely limited, and cause little or no transmission degradation. On the other hand, if a failure occurs in the transmission route through which the most significant bit (MSB) is transmitted, the resultant noise level is equal to $A/2$. This noise level is equal to one-half the maximum amplitude of the information signal and in this instance serious transmission degradation will result. Therefore, in the prior art, when failure has occurred in a transmission route carrying a MSB or any other highly significant bit, it has been necessary to interrupt the signal transmission so that the transmission problems could be corrected.

It is therefore, an object of the present invention to provide a system which is capable, even if failure occurs in a transmission route carrying a highly significant bit such as an MSB, of reducing the noise level to such a low level so that the transmission quality is not effected, and to accomplish this reduction in noise level without interruption of the signal transmission.

SUMMARY OF THE INVENTION

In accordance with the present invention, transmission degradation is reduced by successively interchanging the connections between a plurality of signal bits and a plurality of transmission highways.

BRIEF DESCRIPTION OF THE DRAWINGS

It is a feature of the instant invention that failures on a particular highway are detected and that the connections are interchanged in response thereto.

It is a further feature of the invention that connection interchange can be rapidly accomplished without a disruption in the information being transmitted.

Figure 1:
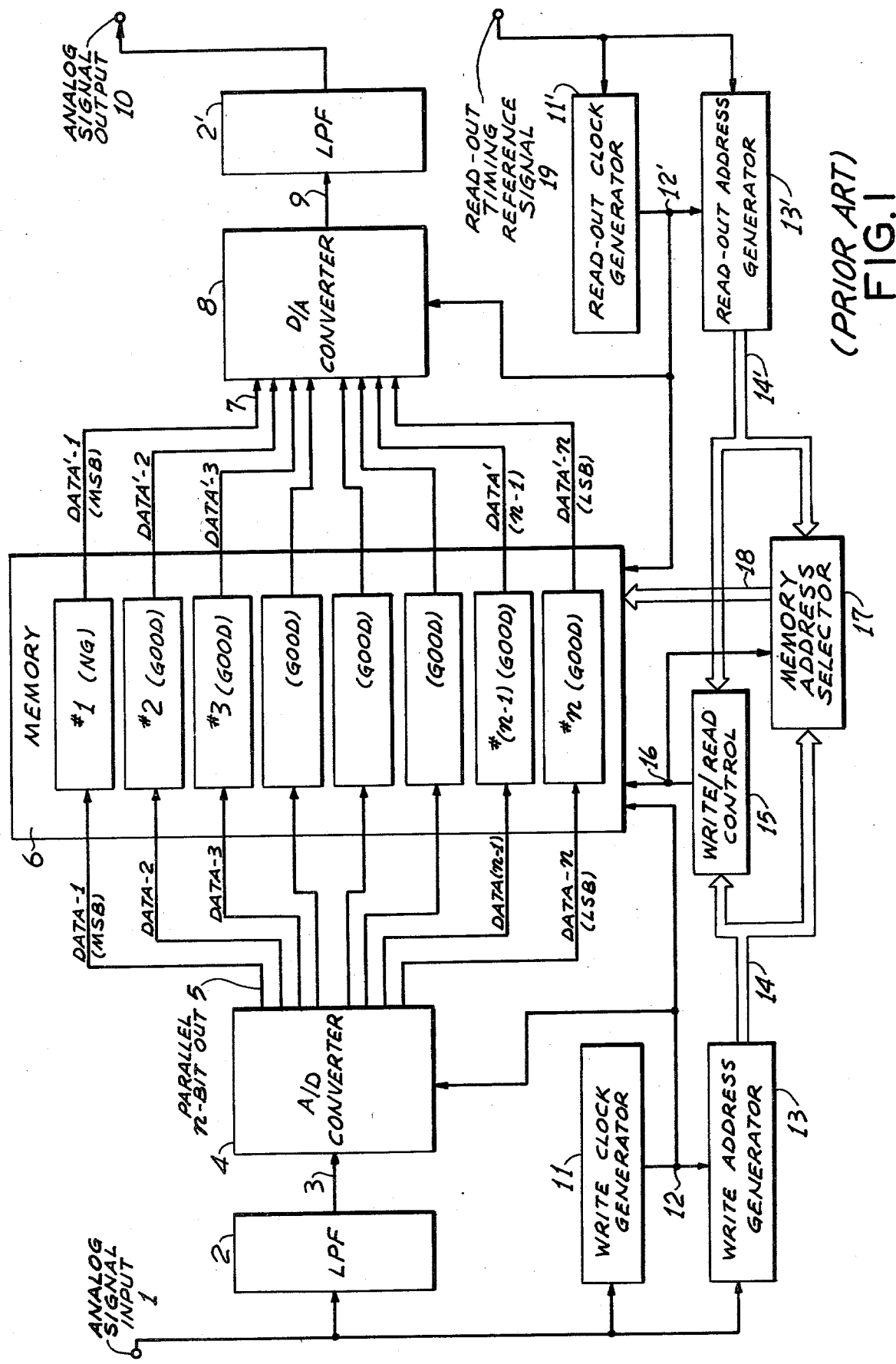

The present invention will next be described, in, detail with reference to the accompanying drawings, which illustrate several preferred embodiments of the invention as utilized in a digital transmission system which includes a frame synchronizer to convert the phase and frequency of an input television signal into a reference phase and frequency.

Figure 2:
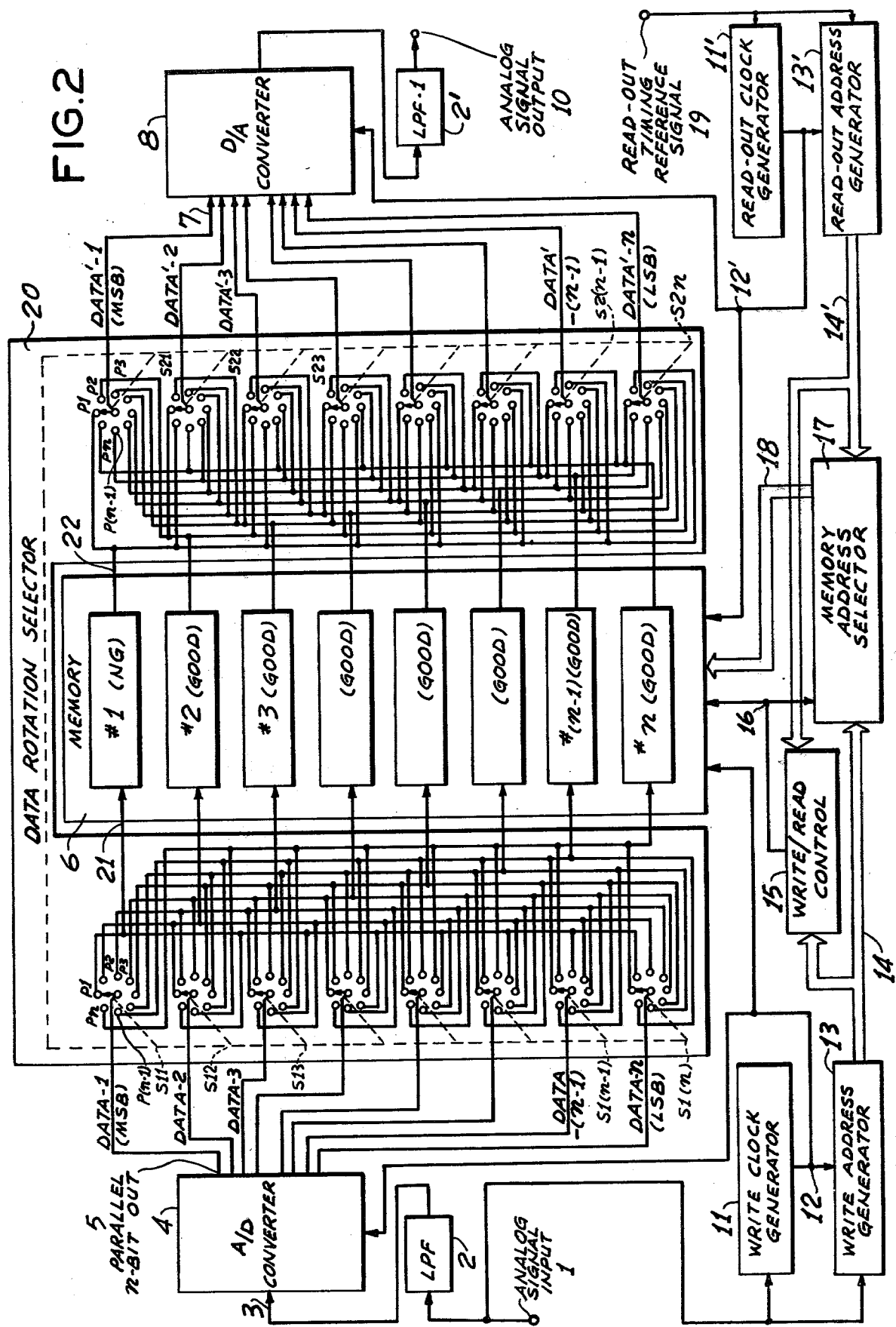
Figure 3:
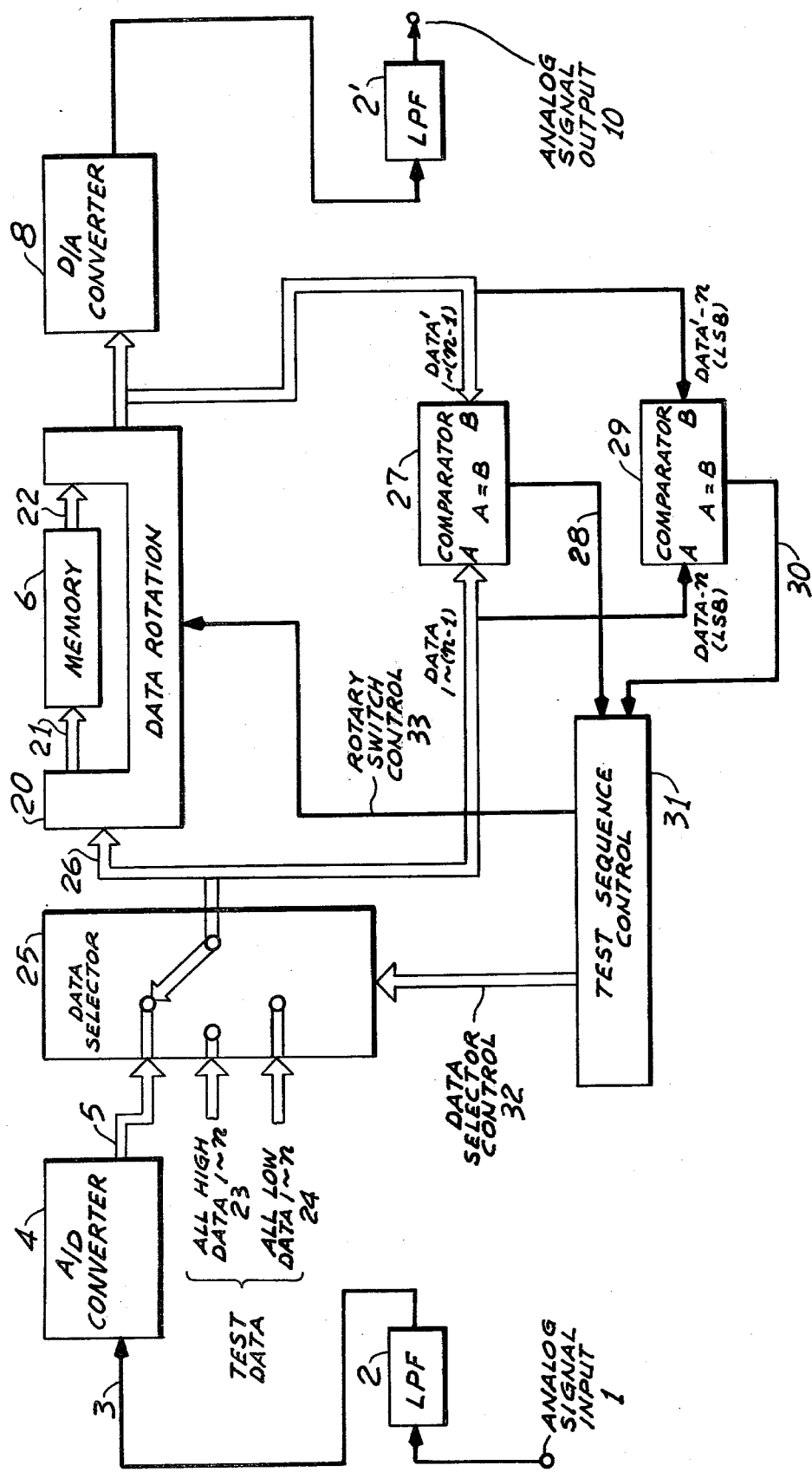
Figure 4:
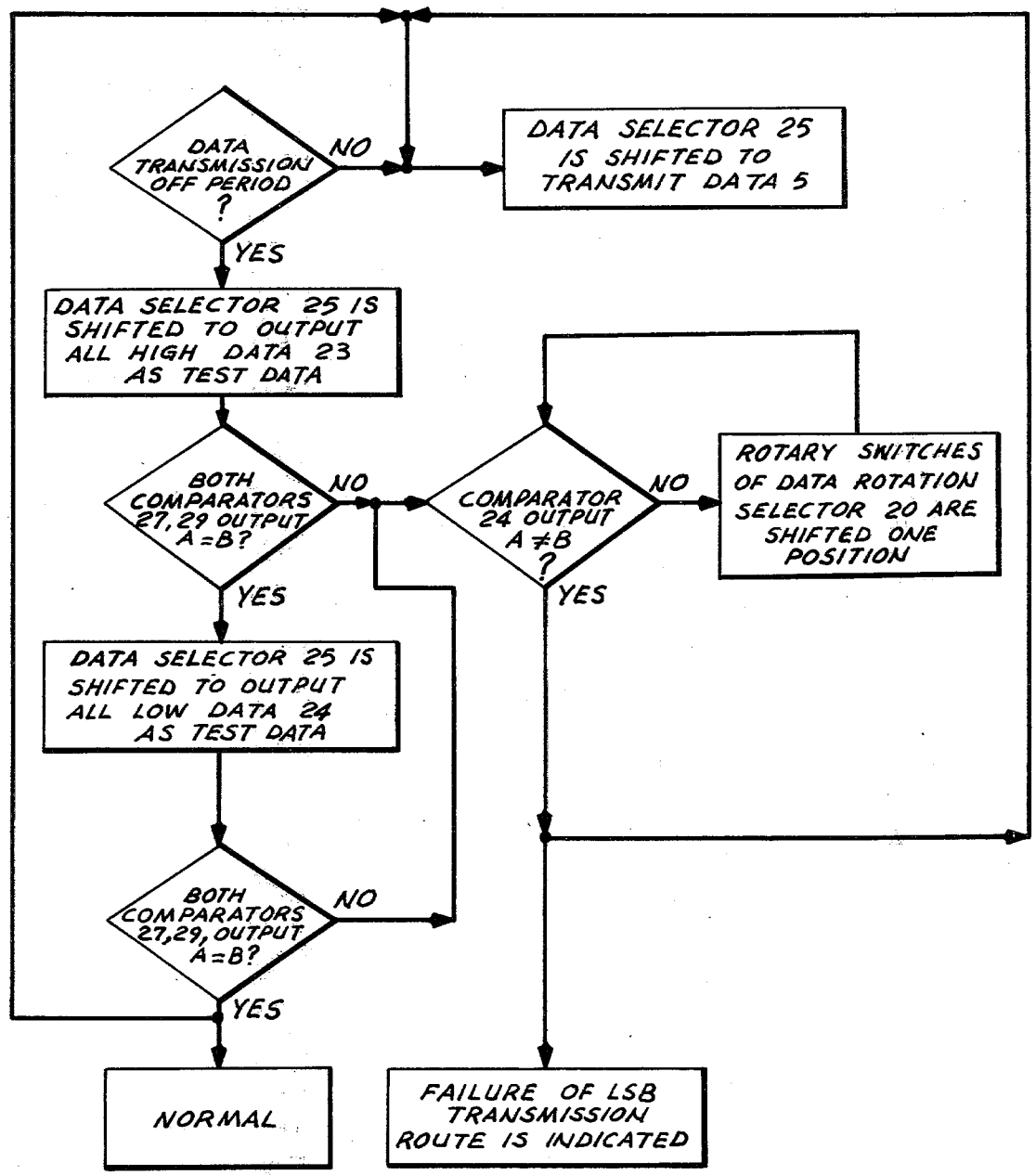

In the drawings:

FIG. 1 illustrates a block diagram of a conventional frame synchronizer;

FIG. 2 illustrates a block diagram of a preferred embodiment of the present invention;

FIG. 3 illustrates a block diagram of a second preferred embodiment of the invention; and FIG. 4 illustrates a flow chart of the test sequence control shown in FIG. 3.

DETAILED DESCRIPTION

Referring to FIG. 1, a conventional frame synchronizer, comprises an input terminal 1 to which an analog television video signal is applied. The input video signal is bandwidth-limited with a low-pass filter 2 to eliminate above frequency components of 5.35 MHz. The ban-limited signal is then applied to A/D converter 4 where it is sampled at frequency of 10.7 MHz and converted into PCM parallel n-bit data 5 (n=8). The A/D converter 4 has a dynamic range of 1.35 p—p. A write clock generator 11 produces write clock pulses 12 (of 10.7 MHz) synchronized with the color burst of the input signal, and a write address generator 13 produces write-in address data 14 synchronized with the sync signal included within the input signal. The information contained in one field of the parallel n-bit data 5 (DATA-1 to DATA-n) is written into an elastic digital memory 6 (units #1 to #n), which has a capacity of approximately 1.5 megabits, at locations designated by the respective write-in address data 14.

A read-out clock generator 11' produces read-out clock pulses 12' synchronized with the color burst of the read-out timing reference signal (color black signal) 19 and a read-out address generator 13' produces read-out address data 14' in synchronism with the sync signal in the read-out timing reference signal 19. The PCM data, stored in the memory 6, is read out under the control of read-out address data 14' and read-out clock pulses 12' and converted into a corresponding PAM signal with D/A converter 8. The PAM signal has spurious components above 5.35 MHz removed with low-pass filter 2' to thereby form a television signal 10 sync-converted or synchronized with the read-out timing reference signal.

Such a conventional frame synchronizer is described in detail in U.S. Pat. No. 3,909,839 entitled "PHASE LOCKING SYSTEM FOR TELEVISION SIGNALS USING DIGITAL MEMORY TECHNIQUES" and U.S. Pat. No. 4,007,486 entitled "PHASE LOCKING SYSTEM FOR TELEVISION SIGNALS USING A DIGITAL MEMORY TECHNIQUE", both patents being assigned to the assignee of the present invention.

Such prior art frame synchronizers are used primarily at television broadcasting stations and are essentially held "ON AIR" at all times. Assume now that memory #n is used for the transmission of the LSB. If the memory unit should fail, the LSB will not be transmitted and the result will be a noise level of $1.35/2^n = 1.35/2^8 = 0.005 Vp-p$ at one point in the picture of output signal 10 of the frame synchronizer, as observed on the screen of a picture monitor. Due to the low noise level practically no noticable transmission degradation results. However, if memory unit #1, which deals with the MSB, should fail, a definite noise of $1.35/2^1 = 0.675$Vpp will appear continuously at a point on the picture monitor screen and the resultant noise level will make the transmission degradation be very conspicuous.

In previous forms of frame synchronizers, it has been common practice to fixedly connect memories #1 through #n to the DATA-1 to DATA-n terminals of the A/D and D/A converters. As a result of the fixed connection, if, the memory IC for the MSB should fail during the time the transmitter is "ON AIR," transmission through the frame synchronizer will be interrupted for an extended period in order to locate and replace the faulty IC. Therefore, in the prior art, it has been impossible to repair such memory failures without interrupting the signal transmission.

In accordance with the present invention, memories #1 through #n are interchangeably connected with the DATA-1 through DATA-n terminals of the A/D converter so that, upon failure of any memory unit, the DATA-n terminal, i.e., the LSB, may be connected to the faulty memory unit to achieve a minimum noise level. Such an interchangeable memory connection enables prompt emergency repair, thereby minimizing transmission degradation.

FIG. 2 is a block diagram of a preferred embodiment of the instant invention, whose features which distinguish from that shown of in FIG. 1 will be described hereinafter.

As illustrated in FIG. 2, a data rotation selector circuit 20 is inserted in the system between the A/D converter 4 and the memory 6 and between the memory 6 and D/A converter 8 and the data rotation selector circuit 20 includes rotary switches $S_{11}$ to $S_{1n}$ and $S_{21}$ to $S_{2n}$ which are operatively associated with each other, having switch positions $P_1$ to $P_n$ arranged in the same pattern. Specifically, DATA-1 (MSB) from the A/D converter 4 is connected to the center of rotary switch $S_{11}$; DATA-2, to the center of $S_{12}$; . . . ; and DATA-n (LSB), to the center of $S_{1n}$. The input of memory #1 is connected to $P_1$ of $S_{11}$, $P_n$ of $S_{12}$, $P_{(n-1)}$ of $S_{13}$, . . . , and $P_2$ of $S_{1n}$. The input of memory #2 is connected to $P_2$ of $S_{11}$, $P_1$ of $S_{12}$, . . . , and $P_3$ of $S_{1n}$. The input of memory #n is connected to $P_n$ of $S_{11}$, $P_{(n-1)}$ of $S_{12}$, . . . , and $P_1$ of $S_{1n}$. The output of memory #1 is connected to $P_1$ of $S_{21}$, $P_n$ of $S_{22}$, $P_{(n-1)}$ of $S_{23}$, . . . , and $P_2$ of $S_{2n}$. The output of memory #2 is connected to $P_2$ of $S_{21}$, $P_1$ of $S_{22}$, $P_n$ of $S_{23}$, . . . , and $P_3$ of $S_{2n}$. The output of memory #n is connected to $P_n$ of $S_{21}$, $P_{(n-1)}$ of $S_{22}$, . . . , and $P_1$ of $S_{2n}$. The DATA-1 terminal for the MSB, is connected to the D/A converter 8 through the center of $S_{21}$; DATA-2, through the center of $S_{22}$; . . . ; and DATA-n, through the center of $S_{2n}$.

With the circuit arrangement described above, the data rotation selector 20 functions as follows: As all the rotary switches are operated successively into positions $P_1, P_2, P_3, \ldots, P_m, \ldots$, and $P_n$, the DATA-1 terminal for the MSB is connected in succession to memories #1, #2, #3, . . . , #m, . . . , and #n while DATA-n, terminal for the LSB, is connected in succession to memories #n, #1, #2, . . . , #(m-1), . . . , and #(n-1).

If, in the connection state shown in FIG. 2, memory #1 should fail, DATA-1 for the MSB, applied to D/A converter 8, will continuously held at a high or low level which will appear at a certain point on the picture monitor screen as a very conspicuous noise level, of 0.675Vpp. However, even if such a memory failure would occur during an ON-AIR interval the faulty memory can be reconnected to the DATA-n terminal for the LSB D/A converter 8 by simply operating the rotary switches from position $P_1$ to $P_2$. In this manner, the noise level will be reduced to a practically unnoticeable level of $0.005V_{pp}$.

It will be readily recognized, therefore, that transmission degradation resulting from memory failure can at all times be minimized irrespective of which memory unit fails simply by positioning the rotary switches so as to connect the faulty memory unit to the DATA-n terminal for the LSB. As illustrated, in the rotation selector circuit, the MSB and the LSB are at all times adjacent to each other in the switch position i.e., the switch position for a minimum noise level is at all times adjacent to that position giving a maximum noise level. This makes it readily possible to select the best position for the rotary switches by rotating them step by step in the direction of $P_1, P_2, \ldots, P_n$ while observing the output signal of the frame synchronizer on a picture monitor.

FIG. 3 is a block diagram of another embodiment of the present invention which is so designed so as to electrically detect a memory failure without the use of a picture monitor and to provide a failure indication while minimizing transmission degradation. This embodiment will be described in terms of features additional to the system shown in FIG. 2. As illustrated, a data selector 25 is inserted between the A/D converter 4 and the data rotation selector circuit 20 and the data selector is operable to select test data 23, all of a high level, or test data 24, all of a low level, in addition to data 5 from the A/D converter 4. The output data 26, from the data selector 25, is directed to the data rotation selector 20 and to comparators 27 and 29. Input data to the D/A converter 8, that is, data 7 from memory 6, is directed to comparators 27 and 29. With this arrangement, DATA-1, through DATA-n directed to the memory, is compared in comparators 27 and 29 with DATA'-1 through DATA-n, from the memory, to detect whether during testing coincidence pulses are continuously prodeuced that is, whether any of the memory units has failed.

Reference will next be had to FIG. 4, which is a flow chart of the test sequence control circuit 31 shown in FIG. 3. As indicated in FIG. 4, if during testing, a non-coincidence (A≠B) is detected in one of the comparators 27, a rotary-switch control signal 33 is produced to consecutively shift the rotary switches of data rotation selector circuit 20 from one position to another until noncoincidence pulses (A≠B) are also produced in the other comparator 29 and the DATA-n of the LSB is connected to the faulty memory unit. In addition, upon the appearance of A≠B in the comparator 29, a trouble indication is given to indicate that the transmission route for the LSB has failed. With the arrangement of FIG. 3, therefore, it will be appreciated that, in accordance with the test sequence control of FIG. 4, any memory failure is electrically detected and transmission degradation is minimized without the use of a picture monitor and the location of the memory failure is determined.

It will be noted further that, if desired, another memory unit #(n+1) may be added to memory 6 as a preparatory unit with an additional position P(n+1) provided on the rotary switches in order that emergency repair may be completed promptly by effecting data rotation selection so as to disconnect whichever memory unit is defective.

Though description has been made herein in connection with a digital memory unit failure, it will be apparent to those skilled in and is generally applicable to minimize transmission degradation resulting from transmission route failure in any system utilizing parallel digital data transmission routes and is generally applicable to any systems having parallel digital data transmission routes.

Although specific embodiments of this invention have been shown and described it will be understood that various modification may be made without departing from the spirit of this invention.

What is claimed is:

1. A parallel data system for storing an information signal in the form of a succession of binary codewords each having n bits (where n is an integer more than one), each of the n bits being data bits utilized only to represent the information content of said information signal, said bits being different in significance from each other, said system comprising memory means for storing said codewords in response to first clock pulses and including n memory units adapted to store said n bits of each of said codewords respectively and simultaneously, and means for respectively applying said n bits to said n memory units, said applying means including n first switching means for interchanging the assignments of said n bits to said n memory units.

2. The data storage system according to claim 1, further comprising means for reading out the stored n bits for each of said codewords from said n memory units in response to second clock pulses to provide n output bits for each codeword, n output lines for respectively receiving said n output bits, and n second switching means for interchanging the receipts of said n output bits by said n output lines.

3. The data storage system according to claim 2, wherein the interchanging of the receipts in said n second switching means is correlated with the interchanging of the assignments in said n first switching means.

4. The data storage system according to claim 3, wherein said first and second switching means are rotary switching means for achieving the interchanging in the order of significance of said bit.

5. The data storage system according to claims 1, 2, 3, or 4, wherein said information signal is a television video signal, and said system further comprises means for producing said first clock pulses from said television video signal, and means for converting said television video signal into said n bits in response to said first clock pulses.

6. The data storage system according to claim 5, further comprising means for decoding said n output bits to the television video signal in response to said second clock pulses.

* * * * *